(12) United States Patent
Patra et al.

(10) Patent No.: US 6,336,949 B1
(45) Date of Patent: Jan. 8, 2002

(54) SLOW RELEASE UREA FERTILIZER COMPOSITION AND A PROCESS FOR THE PREPARATION OF THE SAID COMPOSITION

(75) Inventors: Dharani Dhar Patra; Usha Kiran; Aparbal Singh; Krishna Kumar Agarwal; Suman Preet Singh Khanuja; Mohammad Anwar; Sushil Kumar, all of Lucknow (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 09/263,791

(22) Filed: Mar. 5, 1999

(30) Foreign Application Priority Data

Feb. 12, 1999 (IN) .......................................... 324/DEL/99

(51) Int. Cl.⁷ ............................... C05C 9/00; C05G 5/00
(52) U.S. Cl. ............................... 71/28; 71/58; 71/64.07; 71/64.11; 71/902
(58) Field of Search ........................... 71/23, 28, 64.07, 71/64.11, 64.02, 902, 58

(56) References Cited

U.S. PATENT DOCUMENTS

| 4,578,105 A | * | 3/1986 | Moore | 71/28 |
| 4,845,888 A | * | 7/1989 | Lahalih et al. | 47/9 |
| 5,434,122 A | * | 7/1995 | Lorina et al. | 504/118 |
| 5,654,033 A | * | 8/1997 | McNabb et al. | 427/212 |
| 5,833,733 A | * | 11/1998 | Wada et al. | 71/64.11 |
| 6,159,262 A | * | 12/2000 | Tumbers | 71/11 |

FOREIGN PATENT DOCUMENTS

JP 02199092 * 8/1990

OTHER PUBLICATIONS

Gould et al., Advances in Agronomy, vol 40, pp. 209–238 (1986).

Sahrawat, Advances in Agronomy, vol. 42, pp. 279–309 (1989).

Prasad et al., Advances in Agronomy, vol. 54, pp. 234–281 (1995).

* cited by examiner

Primary Examiner—Wayne Langel
(74) Attorney, Agent, or Firm—Birch, Stewart, Kolasch & Birch, LLP

(57) ABSTRACT

A novel composition for a slow release nitrogenous fertilizer comprising about 0.5–1% of an inert material, 0.5–1% of essential oil or their derivatives on w/w basis and process for the preparation of the composition.

11 Claims, No Drawings

SLOW RELEASE UREA FERTILIZER COMPOSITION AND A PROCESS FOR THE PREPARATION OF THE SAID COMPOSITION

FIELD OF THE INVENTION

The present invention relates to a slow release urea fertilizer composition and a process for the preparation of the said composition. More particularly, the invention relates to a slow release urea fertilizer composition and process for the preparation of the said composition wherein coating of a nitrogenous fertilizer with essential oils or their derivatives acts as a cheap and potential urease/nitrification inhibitor.

BACKGROUND OF THE INVENTION

Nitrogen is considered to be one of the most vital agricultural inputs in crop production. It is estimated that the present global consumption of fertilizer nitrogen is of the order of 77 Tg annually which is likely to be increased to 144 Tg by 2000 AD. The present consumption of fertilizer N in India, of which urea comprises 80%, is about 9.5 million tons, which is estimated to be enhanced to about 14 million tons by the end of this century to produce about 225 million tons food grains. Fertilizer N use efficiency seldom exceeds 50% in arable crops; the utilization efficiency is even less under rainfed conditions, It is further less in paddy (20–30%) where fertilizer losses are greatest. In addition to the large amount of fertilizer N needed, high cost involved in their production or purchase also need to be considered. Thus, efficient use of fertilizer N is necessary, suggesting that regulation of N transformations in soil have a major role to play.

Fertilizer urea when applied to soil is hydrolyzed by enzyme urease to form $NH_4$ and finally to $NO_3$ which is prone to losses through denitrification and leaching. The $NH_4$ is subjected to losses through volatilization. Apart from increasing the cost of cultivation in agriculture, N loss through leaching as well as in gaseous forms has direct concern in environmental degradation. As a consequence of leaching $NO_3$ concentration in ground water has been increasing at an alarming rate. Any technique that can restrict or retard these processes would reduce the loss of N. The present invention deals with finding strategies for retarding urea transformation and nitrification for a higher fertilizer N use efficiency.

PRIOR ART REFERENCE

Lot of research works have been done on management strategies for improving utilization efficiency of nitrogenous fertilizers specially urea which accounts for about 80% consumption of the total nitrogenous fertilizers. A number of review articles have dealt with the environmental, chemical and physical factors affecting the hydrolysis of urea in soil (Gould et al 1986, Adv. Akgron. 40:209–238). Urease inhibitors and methods of controlling urea transformation in soil were thoroughly reviewed by several workers (Sahrawat 1980, Plant Soil 57:335–252, Mulvaney and Bremner 198, Soil Biol. Biochem. 5:153–190). Review of Martens and Bremner (1984) gives an account of inhibitors like phosphorodiamidates and phosphorotriamides which have been found effective in several conditions (Soil Sci. Soc. Am. J. 48:302–305). Several sulfhydryl reagents, hydroquinones, catechol, P-benzoquinones, dihydric phenols. aminocresol have been found to restrict hydrolysis of urea (Rodgers, 1984, Plant Soil 79:115–158). The efficacy of hydroxamic acids has been studied as urease inhibitors but it has not been found very effective for a long period (Pugh and Waid 1969, Soil Biol Biochem. 1:195–206).

Compounds that have structural similarities to urea inhibit urease by competing the same active site on the enzyme. Thio-urea, methyl urea and the substituted phenylurease are known inhibitors of urease. Ash worth et al (1980) measured urea hydrolysis and nitrification inhibition in soil by a number of xanthalates (Soil Sci. Soc. Am. J. 44:1247–1251). Neither the substituted urease nor the xanthalates provide sufficient inhibition of soil urease to be of practical agricultural value. Several phosphoroamide class of compounds have been tested but only few have been examined as potential under some specific environmental and edaphic conditions. Urea has been coated Nvitli resin, plastic shellac, silica and sulphur and impregnated with petroleum wax in order to retard the dissolution of urea in the soil. Sulphur coated urea has been found most effective among the coated fertilizers but its main disadvantages are higher cost than soluble nitrogenous fertilizers and soil acidification due to formation of $H_2SO_4$.

Another slow release urea fertilizer is produced by polymerization or condensation of urea with an aldehyde. Crotonylidinediurea ((CDU) and isobuitlidene diurea (IBDU) are zo slow release nitrogen sources produced by the condensation of two urea and two aldehyde molecules (Gould et al 1986, Adv.Agron. 40:209–238). IBDU have been found superior to SCU under field conditions.

In order to reduce volatilization of ammonia urea has been mixed with other chemicals such as ammonium polyphosphate, phosphoric, boric and nitric acid (Mudrock and Frye, 1985, Adv. Agron. 77:630–633). Similarly urea-thiourea mixtures placed in either bands or pellets have been used to retard the transformation of urea in the soil. Thiourea is both a weak urease and nitrification inhibitor; alone it has been utilized as a slowly available source of both sulphur and nitrogen (Malhi and Soper 1981, Agron. J. 73:991–995). Nitrification inhibitors are the materials which restrict the microbiological oxidation of armonium to nitrate thereby reducing the loss of N by leaching and denitrification. The literature on nitrification inhibitors is very extensive (Prasad et al. 1971, Adv. Agron. 23:337–383, Sahrawat and Keeney 1985, Commu. Soil Sci. Pl. Anal. 16:517–524; Sahrawat 1989, Adv. Agron. 42:279–302). These reviews cover various aspects of the effects of nitrification inhibitors on retardation of nitrification in soil and crop production. In a recent revies Prasad and Power (1995) provides an overview of the status on the use of nitrification inhibitors in relation to productivity, human and animal health and the environment (Adv. Agron. 54:234–281). The interest in nitrification inhibitors followed the development of nitrapyrin (2-chlor-6-(trichloromethyl pyridine) by the DOW chemical company USA as an effective inhibitor of nitrificanon. Subsequently a series of chemicals viz. BHC. sodium azide sodium chlorate. dicyanodiamide (DCD), thiourea AM (2-amino-4 chloro-6 methyl prindine), ATC (4 amino-1,2,4 tnazole), N-serve etc. have been identified as nitrification inhibitors (Sahrawat et al 1989, Adv. Agrron. 42:279–309). Use of most of these chemicals have been restricted to academic experimental stage because of their difficult availability, higher cost and adverse effect on soil processes. Allelochemic inhibition of the process of mineralization and nitrification has been reported to occur in many ecosystem (White 1986, Biol. Fert. Soil 2:97–104). Polyphenols particularly tannins and organics which are water soluble and volatile are presumed to have N-inhibitory properties: Karanjin from Karanj (Pongamia glabra) and tea waste have been reported to retard nitrification (Sahrawat et al 1989, Adv. Agron. 42:279–309). Medicinal plant products like Pyrethrum flower (Crvsanthaxium cinerariefolium) waste have also been found to have this property (Ram et al 1993, Indian Soc. Soil Sci. 41:176–177).

Researches being carried out in India on inhibitors have been reviewed by Prasad et al (1971, Adv. Agron. 23:337–383 and Sahrawat et al 1989, Adv. Agron. 42:279–309). Lac-coated urea (LCU) has been effectively evaluated by Bhowmik (1980, Fert. News 25:17–19). Dissolution rate of LCU has been found to be more or less equal to sulphur coated urea. The pioneering works in India on this aspect include that of Prasad and Rajale (1972, Soil Biol Biochem. 4:450–457), and Sahrawat et al (1989, Adv. Agron, 42:279–309), who reported inhibitory properties in Karanj (Pongamia glabra) and Neem (Azadirachta indica). Neem cake coated urea besides having slow releasing properties had additional beneficial effect in inhibiting nitrification in soil.

OBJECTS OF THE INVENTION

The main objective of the present invention is the preparation of a slow release urea fertilizer composition and a process for the preparation of the said composition which obviates the drawbacks of the previous inventions. Another objective of the present invention is to develop a cheap and eco-friendly urease and nitrification inhibitor. The materials being easily decomposable are expected to leave no adverse influence in soil.

SUMMARY OF THE INVENTION

In accordance with the above objectives, the invention provides a novel composition for a slow release nitrogenous fertilizer comprising about 0.5–1% of an inert material, and 0.5–1% of essential oil or their derivatives on w/w basis. The invention also provides a process for the preparation of the composition of a slow release nitrogenous fertilizer comprising the steps of coating a nitrogenous fertilizer with an inert material, air drying the coated fertilizer, further coating the said coated fertilizer with an essential oil or its derivatives and drying the coated fertilizer for about 24 hours.

DETAILED DESCRIPTION OF THE INVENTION

The present invention comprises of development of urease and nitrification inhibitors from some essential oils and their derivatives viz. *Mentha spicata* oil, denentholosized oil (DMO) and terpene coated with nitrogenous fertilizer (urea) at 0.5–1.0% on w/w basis. At 0.5% level of application, these three natural products retard nitrification to an extent of 24–31% over control (no coating material) as against 32% with DCD as the standard reference. The corresponding retardation at 1% level of application ranges between 33–37%; DCD retards nitrification by 44% over control. The urease activity retarted by 15–29% over control (urea alone) at 0.5% level of application and 26–34% over control at 1.0% level of application of the materials. Nitrosomonas activities decreased by 9–51% and Nitrobactor activities by 68–89% over control, with coating of urea with the natural products. Consequently coating urea with natural products increased apparent nitrogen recovery to 48–56% as against 29% with urea alone (no coating material) and 48% with DCD.

Accordingly, the present invention provides a slow release urea fertilizer composition and a process for the preparation of the said composition which comprises about 0.5 to 1.0% of an inert material such as castor oil, about 0.5 to 1.0% of essential oil or their derivatives and the balance being a nitrogeneous fertilizer such as urea on w/w basis.

In an embodiment of the invention the process for the preparation of slow release fertilizer composition comprises coating a nitrogeneous fertilizer such as urea with an inert material such as castor oil and air drying the said coated nitrogeneous fertilizer for 24 hours followed by further coating the said castor oil coated fertilizer with an essential oil or its derivatives and air drying the said coated fertilizer for about 24 hours.

In another embodiment of the invention wherein essential oils or their derivatives used for coating nitrogeneous fertilizers act as "urease and nitrification" inhibitors.

In yet another embodiment, inert material such as castor oil is used for coating the nitroaeneous fertilizer as a fixative material.

In still another embodiment of the present invention the essential oils and their derivatives used may be selected from *Mentha arvensis, Mentha spicata, Mentha piperita, Mentha citrata* terpene, DMO etc.

EXAMPLE

1. Incubation Experiment

To find out the efficacy of the proposed materials as potent urease and nitrification inhibitors a series of laboratory and greenhouse experiments were conducted. Three essential oils/derivatives and dicyanodiamide (DCD), a commercially used chemical inhibitor, as the check were compared. The natural products used were essential oil of bergamot mint (*Mentha spicata*), and terpene and dementholized oil (DMO), the by-products of Japanese mint (*Mentha arvensis*) oil. Urea (46%) was coated with the essential oils/products and the DCD separately using castor (*Ricinus communis*) oil as the fixative material. For this, first castor oil coating of urea granules was done by physical mixing of castor oil (1%) followed by air drying for about 24 hrs and another coating with the natural products like essential oils and their by-products (1%w/w) followed by air drying for about 24 hrs. Similarly urea was coated with essential oils of other natural products like *Mentha spicata, Mentha arvensis*, dementholized oil, terpene and also with Chemical like DCD separately.

At 24 hours after the coating was done various coated urea samples were mixed with 500 g soil (sand loam, pH 8.2 available N 65 mg kg$^{-1}$) separately and were kept in plastic containers. A control (with urea alone. no coating) was used as reference. Te soils under all the treatments having four replications each were incubated at 25° C. after maintaining at 60% of the maximum water holding capacity of soil. In on set of experiment. soils were analysed for urease acti,it and urea N after 24 hours of incubation following methods of Tabatabai and Bremner ( 1972, Soil Biol. Biochem. 479–487).

Representative soil samples were analyzed for different forms of N i.e., urea N, $NH_4$ and $NO_3$-N at regular intervals for two weeks to assess the nitrification inhibitory properties of the materials in question following the standard procedures (Douglas and Bremner, 1970, Soil Sci. Soc. Am. Proc. 34:859–862). Another set of experiment was conducted to assay the total bacterial population, total actinomycetes population and nitrifying bacteria viz., Nitrosomons and Nitrobacber (Alexander and Clark, 1965, In. Method of Soil Analysis Part II (CA Black Eds) Am. Soc .Agron. Inc. Wisconsin, U.S.A.; KenKnight and Torariko. 1973, Agrokhimiya 7:3)

2. Greenhouse Experiment

To confirm the results of the incubation a pot culture experiment was conducted subsequently taking menthol mint (*Mentha arvensis*) as the test crops. Eight kg soil (<2 mm) were put in plastic container. The same fertilizers coating treatments as were in incubation experiment were imposed in this experiment, except that instead of two levels of coating materials, these were applied at 1.00% on v/w basis. The experiment was laid in a completely randomized design with four replications. The soils were analyzed for mineral forms of N at regular intervals. In addition, the plant samples were analyzed for N accumulation and apparent N recovery.

$$\text{Apparent } N \text{ recovery} = \frac{N \text{ accumulation in treatment pot (mg/kg)} - N \text{ accumulation in control pot (mg/kg)}}{\text{Amount of } N \text{ applied (mg/kg)}} \times 100$$

Influence of the Materials on N Transformation (mineralization) and Urease Activity, Nitrification and Fertilizer N Recovery Results from the incubation experiments (Table 1) indicate that both terpene and DMO (dementholized oil) delayed the urea hydrolysis as evidenced by a significantly higher concentration of urea —N on day 1 after the imposition of treatments. This effect persisted till day 2 in terpene coated urea. All the essential oil/derivatives were as effective as DCD with respect to regulation of urea —N conversion to $NH_4$—N and $NO_3$—N. In all the treatments formation of $NO_3$—N decreased with increasing the dose of the materials from 0.5% to 1.0%. DCD maintained a higher level of $NH_4$ in the initial stage as compared to the rest of the treatments. Accumulation of $NH_4$ is sometime undesirable as an excess of $NH_4$ helps in increasing soils pH making the conditions in soil microsites con<enial for $NH_3$ volatilization. Comparing on the basis of mean $NO_3$ produced the % retardation of nitrification at 0.5% level of application of the materials were 32, 31, 24, and 29% respectively with DCD, Mentha spicata oil, Terpene and DMO. The corresponding inhibition at 1.0% level of application were 44, 33. 35 and 37%, respectively.

Almost similar trend with respect to transformation of urea N (forms of N) was observed in the greenhouse experiment when the status of mineral N was assessed at weekly intervals (Table 2). As in incubation experiment, accumulation of $NH_4$—N was higher with DCD treated soil during week 1. Total $NO_3$ production was estimated to be retarded by 66%, 57%, 54% and 56% over urea alone with coating of urea with DCD, Mentha spicata oil, terpene and DMO, respectively. Urease activity which is an indicator of urea transformation (hydrolysis) was significantly influenced by the coating materials (Table 3). Urease activity was significantly retarded by the natural products. The extent of urease activity retardation was estimated to be 3.5, 22, 15, 29% over urea alone with DCD, M. spicata oil, terpene and DMO at 0.50% level of application. The corresponding values at 1.0% level of application were 15, 26, 34 and 29%, respectively.

An assessment of the soil microbial activity indicate that all the coating materials influenced the counts of Nitrosomonus and Nitrobacter responsible for nitrification, as well as actinomycetes and total bacteria (Table 4). Nitrsomonus population decreased by 9–51% over urea alone, with coating of urea with different natural products and DCD., and the population further decreased with enhancing the dose from 0.5% to 1.0%. In general M. spicata oil was observed to have highest inhibitory properties towards Nitrosomonus activities. As in Nitrosomonus, Nitrobacter population was significantly retarded by the coating materials. Nitrobacter population decreased by 68–87% over urea alone, with coating urea with different materials. Highest retardation (87%) was observed with DCD at 1% level of application as against 84, 78 and 81% with M. spicata oil, terpene and DMO, respectively at the same concentration. Total actinomycetes population was lowered by 70–73% with different coating materials. Finally, an account of the total bacterial population indicate a significant antibacterial properties of the synthetic and natural products. The natural products were found more effective than DCD specially at 1.0% level of application. The extent of retardation of bacterial counts by these products were 25–75% over urea alone. Influence of these material on urease and nitrification inhibitory properties and regulation of urea - N transformation was reflected on the apparent N recovery (%), total N accumulation by the plant and subsequently the herb yield of the test crop (Table 5). Herb yield increased by 23, 37, 25 and 32% over urea alone, with urea coated Faith DCD. M spicata oil. terpene and DMO. respectively Like wise N accumulation increased by 42, 55, 43 and 59% over urea alone. All these materials resulted in a higher apparent recovery as compared to urea applied alone. Nitrogen recovery ranged between 48 to 56% with these materials against 29% with urea alone.

The present invention comprises of evaluation of some urease and nitrification inhibitory properties in some essential oils and their derivatives. *Mentha spicata* oil, terpene ( a component of mint oil) and DMO have distinct urease and nitrification inhibitory properties. At 0.5% level of application, these three materials retard nitrification to an extent of 24–31% as against 32% with DCD. The corresponding retardation at 1% ranges between 33–37%; DCD retard nitrification by 44%. The natural products inhibits urease activity by 15–29% at 0.5% level of application and 26–34% at level of application. These products inhibit the population of Nitrosomonas by 9–51% and that of Nitrobacter by 68–87% as compared to urea alone. These materials also inhibit the activities of actinomycetes and total bacteria in the soil All these material increased fertilizer recovery by 49–56% as against 29% with urea alone and 48% with DCD.

TABLE 1

Influence of different coating materials on N transformation at different stages of incubation

| | Forms of N (Mg kg$^{-1}$ soil) | | | | | | | | |
|---|---|---|---|---|---|---|---|---|---|
| | Day 1 | | | Day 2 | | | Day 3 | | |
| Treatments | Urea | NH$_4$ | No$_3$ | Urea | NH$_4$ | No$_3$ | Urea | NH$_4$ | No$_3$ |
| Urea alone (no coating materials) | 4.5 | 42.5 | 99 | — | 6.2 | 218 | — | 16.7 | 169 |
| Urea + DCD | | | | | | | | | |
| (0.50)* | 16.0 | 59.5 | 80 | — | 8.0 | 122 | — | 23.2 | 97 |
| (1.00)* | 16.8 | 69.5 | 68 | — | 18.5 | 54 | — | 32.3 | 98 |
| Urea + *M. spicata* oil | | | | | | 15 | | | |
| (0.50) | 10.3 | 51.0 | 76 | — | 8.0 | 113 | — | 18.9 | 113 |
| (1.00) | 18.0 | 50.0 | 68 | — | 13.0 | 108 | — | 32.8 | 111 |
| Urea + Terpene | | | | | | | | | |
| (0.50) | 24.5 | 50.5 | 98 | 6.8 | 6.0 | 158 | — | 20.3 | 108 |
| (1.00) | 42.0 | 36.5 | 71 | 8.2 | 5.0 | 86 | — | 30.1 | 119 |
| Urea + DMO | | | | | | | | | |
| (0.50) | 28.0 | 35.5 | 90 | — | 5.0 | 124 | — | 20.1 | 110 |
| (1.00) | 34.8 | 56.0 | 55 | — | 8.0 | 95 | — | 23.5 | 119 |
| LSD (P = 0.05) | 3.98 | 8.13 | 7.25 | — | 1.23 | 10.3 | — | 3.85 | 8.50 |

| | Forms of N (Mg kg$^{-1}$ soil) | | | | | | | | |
|---|---|---|---|---|---|---|---|---|---|
| | Day 7 | | | Day 14 | | | Mean | | |
| Treatments | Urea | NH$_4$ | No$_3$ | Urea | NH$_4$ | No$_3$ | Urea | NH$_4$ | No$_3$ |
| Urea alone (no coating materials) | — | 10.3 | 136 | — | 6.9 | 155 | — | 16.5 | 155 |
| Urea + DCD | | | | | | | | | |
| (0.50)* | — | 5.2 | 95 | — | 8.9 | 135 | — | 20.9 | 105 |
| (1.00)* | — | 8.3 | 92 | — | 8.9 | 130 | — | 27.5 | 86 |
| Urea + *M. spicata* oil | | | | | | | | | |
| (0.50) | — | 4.5 | 106 | — | 11.9 | 128 | — | -18.9 | 107 |
| (1.00) | — | 2.7 | 99 | — | 10.2 | 132 | — | 21.7 | 104 |
| Urea + Terpene | | | | | | | | | |
| (0.50) | — | 2.3 | 108 | — | 10.9 | 120 | — | 18.0 | 118 |
| (1.00) | — | 2.9 | 101 | — | 9.2 | 122 | — | 16.7 | 100 |
| Urea + DMO | | | | | | | | | |
| (0.50) | — | 3.2 | 109 | — | 9.4 | 121 | — | 14.6 | 110 |
| (1.00) | — | 3.8 | 101 | — | 10.2 | 122 | — | 22.3 | 98 |
| LSD (P = 0.05) | — | — | 6.25 | — | — | 7.28 | — | 4.25 | 8.2 |

*added at 0.50% and 1.00% w/w basis; urea applied at 100 mg N kg$^{-1}$ soil.

TABLE 2

Influence of different coating materials on N mineralization in soil cropped with menthol mint (*Mentha arvensis*)

| | Mineral N (mg kg$^{-1}$ soil) | | | | | | | | | | | |
|---|---|---|---|---|---|---|---|---|---|---|---|---|
| | Week I | | Week II | | Week III | | Week IV | | Week 18 | | Total | |
| Treatments | NH$_4$ | NO$_3$ | NH$_4$ | NO$_3$ | NH$_4$ | NO$_3$ | NH$_4$ | NO$_3$ | NH$_4$ | NO$_3$ | NH$_4$ | NO$_3$ |
| Control (no fertilizer and no coating material) | 6.5 | 6.4 | — | 2.8 | — | 6.4 | — | 9.3 | 2.2 | 3.5 | 8.7 | 28.4 |
| Urea alone (no coating material) | 19.2 | 107 | 25.5 | 118 | 8.0 | 45 | — | 34 | 10.2 | 18.2 | 62.9 | 324 |
| Urea + DCD | 44.8 | 59 | 50.0 | 24 | 11.8 | 14 | 10.5 | 20 | 3.4 | 12.5 | 120.6 | 110 |
| Urea + *M. spicata* oil | 14.0 | 53 | 22.2 | 32 | 3.0 | 22 | — | 25 | 10.2 | 7.6 | 49.4 | 140 |
| Urea + Terpene | 18.4 | 54 | 15.2 | 50 | 5.5 | 15 | — | 21 | 6.2 | 10.0 | 45.3 | 150 |
| Urea + DMO | 22.0 | 49 | 18.5 | 44 | 6.2 | 16 | — | 22 | 5.8 | 11.2 | 50.5 | 142 |
| LSD (p = 0.05) | 3.8 | 6.2 | 3.48 | 5.5 | 2.8 | 5.2 | — | 6.8 | 2.2 | 3.2 | 7.8 | 12.5 |

Nitrogen in the form of urea applied at 100 mg N kg$^{-1}$, coating material @ 1% w/w basis.

TABLE 3

Influence of different coating materials on urease activity (in terms of μg NH$_4$—N liberated/g soil/hour)

| Treatments | | Urease activity |
|---|---|---|
| Control (no fertilizer and no coating material) | | 24.5 |
| Urea alone (no coating materials) | | 66.5 |
| Urea + DCD | (0.50) | 63.0 |
| | (1.00) | 56.7 |
| Urea + M. spicata oil | | |
| | (0.50) | 52.0 |
| | (1.00) | 49.2 |
| Urea + Terpene | | |
| | (0.50) | 56.5 |
| | (1.00) | 43.7. |
| Urea + DMO | | |
| | (0.50) | 47.2 |
| | (0.10) | 47.5 |
| LSD (P = 0.05) | | 8.52 |

Urea applied @100 mg N kg$^{-1}$ soil, coating materials applied @0.50 and 1.00 w/w basis.

TABLE 4

Influence of different coating materials on Nitrosomonus, Nitrobacter, total actinomycetes and bacterial population in soil

| Treatment | | Nitrosomonus × 103, g$^{-1}$ soil | Nitrobacter × 103, g$^{-1}$ soil | Actinomycetes × 104, g$^{-1}$ soil | Total bacteria × 105, g$^{-1}$ soil |
|---|---|---|---|---|---|
| Control (no fertilizer and no coating materials) | | 1.10 | 2.50 | 6.50 | 2.00 |
| Urea alone (No coating materials) | | 3.30 | 14.00 | 5.66 | 4.00 |
| Urea + DCD | (0.50)* | 3.30 | 4.30 | 1.00 | 1.00 |
| | (1.00)* | 2.85 | 1.80 | 1.00 | 1.00 |
| Urea + M. spicata oil | | | | | |
| | (0.50) | 1.85 | 2.30 | 1.00 | 1.00 |
| | (1.00) | 1.60 | 2.20 | 2.50 | 2.00 |
| Urea + Terpene | | | | | |
| | (0.50) | 3.00 | 3.60 | 1.50 | 3.00 |
| | (1.00) | 2.80 | 3.10 | 1.50 | 1.50 |
| Urea + DMO | | | | | |
| | (0.50) | 3.00 | 4.50 | 4.50 | 1.50 |
| | (1.00) | 2.60 | 2.60 | 1.50 | 1.00 |
| LSD (p = 0.05) | | 0.25 | 0.50 | 0.45 | 0.45 |

*added at 0.50 and 1.00% on w/w basis; urea applied at 100 mg N kg$^{-1}$ soil.

TABLE 5

Influence of different coating materials or herb yield, total N accumulation and apparent N recovery in menthol mint (Mentha arvensis) as the test crop

| Treatments | | | | Apparent |
|---|---|---|---|---|
| Level of urea N (mg kg$^{-1}$) | Costing materials | Herb yield (g pot$^{-1}$) | N accumulation (mg pot$^{-1}$) | recovery (%) |
| 0 (centre) | Nil | 30.5 | 159 | — |
| 100 | Nil | 42.8 | 450 | 29.1 |
| | DCD | 52.7 | 640 | 48.1 |
| | M. spicata | 58.5 | 696 | 53.7 |
| | Terpene | 53.4 | 644 | 48.5 |
| | DMO | 56.5 | 716 | 55.7 |
| LSD (P = 0.05) | | 5.38 | 11.8 | |

*added at 1.00% w/w basis.

ADVANTAGES OF THE INVENTION

These natural products are as effective as dicyanodiamide (DCD) as nitrification inhibitor.

These products have higher urease inhibitory properties as compared to DCD. These products do not allow higher accumulation of NH$_4$—N, following hydrolysis of urea. Higher accumulation of NH$_4$—N is undesirable as an excess of NH$_4$—N helps in increasing soil pH and thereby causing volatilization of NH$_3$. These materials being natural and having low persistence, are expected to leave no adverse effect on beneficial soil flora and related transformation process and the environment.

These products are cheaper than the synthetic inhibitors.

What is claimed is:

1. A slow release nitrogenous fertilizer composition comprising a nitrogenous fertilizer, about 0.5–1% of an inert material, and 0.5–1% of an essential oil or its derivatives on a w/w basis.

2. The composition of claim 1, wherein the essential oil or its derivatives coats the nitrogenous fertilizer and inert material.

3. The composition of claim 1, wherein the inert material is a castor oil.

4. The composition of claim 1, wherein the essential oil or its derivatives act as urease and nitrification inhibitors.

5. The composition of claim 1, wherein the essential oil or its derivatives is selected from the group consisting of essential oils of Mentha arvensis, Mentha spicata, Menta piperita, Menta cirata, Terpene and DMO (demetholized oil).

6. The composition of claim 1, wherein the nitrogenous fertilizer is urea.

7. A process for the preparation of a composition of a slow release nitrogenous fertilizer comprising the steps of
   a) coating a nitrogenous fertilizer with an inert material;
   b) air drying the coated fertilizer of step (a) for 24 hours;
   c) further coating the coated fertilizer of step (b) with an essential oil or its derivatives;
   d) air drying the coated fertilizer of step (c) for about 24 hours.

8. The process as claimed in claim 7 wherein the nitrogenous fertilizer is urea.

9. The process as claimed in claim 7 wherein the essential oils or its derivatives act as urease and nitrification inhibitors.

10. The process as claimed in claim 7 wherein the inert material is a castor oil.

11. The process as claimed in claim 7 wherein the essential oil or its derivatives are selected from the essential oils of *Mentha arvensis, Mentha spicata, Mentha piperita, Mentha cirata*, Terpene and DMO (demetholized oil).

\* \* \* \* \*